United States Patent [19]

Elmer

[11] 4,231,261
[45] Nov. 4, 1980

[54] FLUID PRESSURE MEASURING DEVICE

[75] Inventor: Charles W. Elmer, Merrillville, Ind.

[73] Assignee: Inland Steel Company, Chicago, Ill.

[21] Appl. No.: 41,107

[22] Filed: May 21, 1979

[51] Int. Cl.³ .................... G01L 13/02; G01F 1/38
[52] U.S. Cl. ................................ 73/716; 73/861.49
[58] Field of Search ............ 73/205 R, 211, 747, 73/706, 716, 715

[56] References Cited

U.S. PATENT DOCUMENTS

| 2,105,127 | 1/1938 | Petroe ............................ 73/205 R |
| 2,295,485 | 9/1942 | Leone ............................ 73/205 R |
| 2,310,546 | 2/1943 | Robinson ....................... 73/205 R |
| 3,645,138 | 2/1972 | Fussell ........................... 73/706 |

Primary Examiner—Donald O. Woodiel

Attorney, Agent, or Firm—Merriam, Marshall & Bicknell

[57] ABSTRACT

A conduit conducting a dirty gas is connected by one line to an interface device connected by another line to a pressure measuring device having a cavity and a diaphragm defining one wall of the cavity. The interface device has a pair of chambers in fluid communication at their upper ends. The bottom end of one chamber is in fluid communication, via the one line, with the conduit conducting the dirty gas. The bottom of the second chamber is in fluid communication, via the other line, with the cavity in the measuring device. The second chamber, the cavity and the line connecting them are filled with a liquid which keeps dirt in the dirty gas from entering the cavity but transmits the pressure of the dirty gas to the diaphragm in the cavity.

8 Claims, 6 Drawing Figures

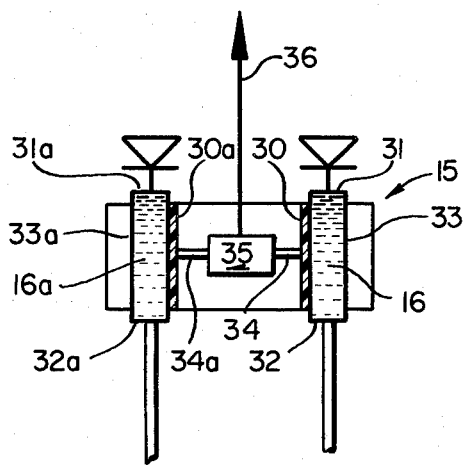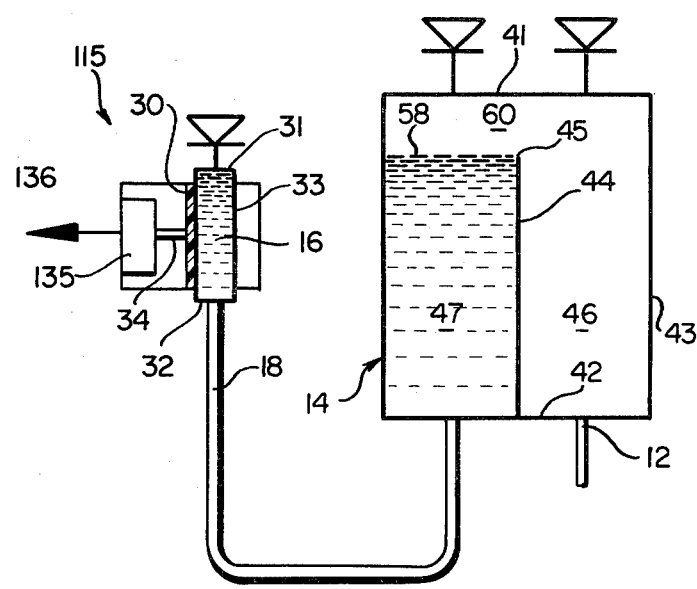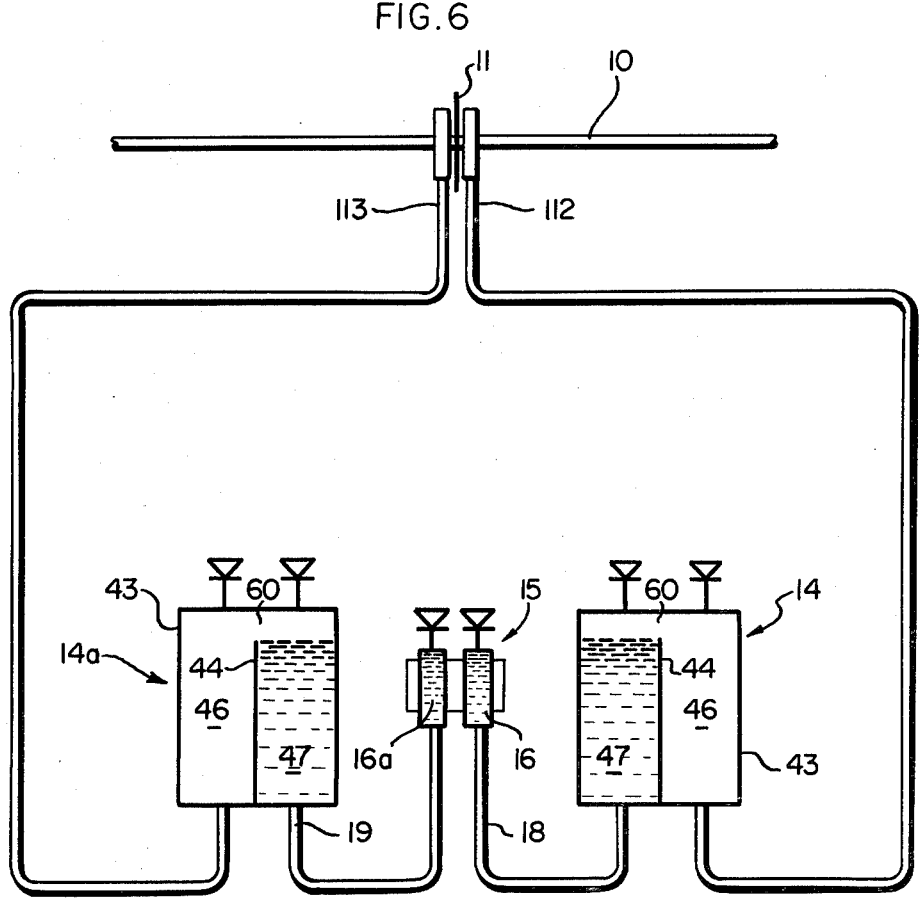

FLUID PRESSURE MEASURING DEVICE

BACKGROUND OF THE INVENTION

The present invention relates generally to devices for measuring the flow rate or pressure of a fluid in a conduit and more particularly to devices for making such measurements with respect to conduits conducting dirty gases (e.g. coke oven gas) or dirty liquids.

Typically, such devices comprise a cavity connected by a line to the conduit through which flows the fluid whose pressure is to be measured. The connecting line puts the cavity in fluid communication with the conduit and allows fluid from the conduit to enter the cavity. One wall of the cavity is a diaphragm, and the pressure of the fluid entering the cavity is exerted against the diaphragm which in turn is connected to pressure-measuring instruments to record the pressure exerted on the diaphragm by the fluid in the cavity.

Oftentimes it is necessary to measure the pressure in a dirty fluid, such as coke oven gas. These dirty gases contain foreign elements which, if they enter the cavity of the measuring device, could, in time, plug the cavity and interfere with the measuring function thereof. This, of course, is undesirable.

SUMMARY OF THE INVENTION

The present invention comprises structure for preventing plugging of the cavity in the measuring device by foreign elements in the dirty fluid whose pressure is being measured. In the present invention, an interface device is installed in the connecting line between the fluid conduit and the cavity of the measuring device. This interface device contains two chambers separated by a vertical wall having an upper end located below the tops of the two chambers. Each chamber is in fluid-communication with the other chamber over the upper end of the vertical separating wall.

The bottom of the first chamber in the interface device is connected to the fluid conduit by a first connecting line. The bottom of the second chamber is connected, by a second connecting line, to the bottom of the cavity in the measuring device. The second chamber in each interface device is filled with a liquid, such as oil or mercury, and the liquid in the second chamber also fills the cavity and the line connecting the second chamber to the cavity.

The liquid level in the second chamber is maintained at least as high as, and preferably slightly higher than, the top of the cavity. This is done by providing the separating wall in the interface device with an upper end at least as high as, and preferably higher than, the top of the cavity to which the interface device is connected. A liquid level in the interface device which is at least as high as that in the cavity prevents the formation of air pockets in the cavity. Air pockets could cause measuring errors.

During the measuring operation, gases from the fluid conduit flow through the first connecting line into the first chamber of the interface device, at the bottom thereof, then flow over the top of the vertical separating wall and accumulate over the top of the liquid in the second chamber where the gases exert pressure on that liquid. This pressure is transmitted through the liquid in the second chamber, through the liquid in the line connecting the second chamber to the cavity of the measuring device and through the liquid in the cavity to the membrane defining one wall of that cavity.

Dirt and gases entering the first chamber of the interface device accumulate in the first chamber and eventually may be cleaned out, through a clean-out port provided for that purpose. Because this dirt accumulates in the interface device, the dirt does not enter the cavity of the measuring device and thus cannot interfere with the measuring function thereof.

Other features and advantages are inherent in the structure claimed and disclosed or will become apparent to those skilled in the art from the following detailed description in conjunction with the accompanying diagramatic drawings.

BRIEF DESCRIPTION OF THE DRAWING

FIG. 4 is an enlarged diagramatic view of the measuring device of the embodiment of FIG. 1;

FIG. 5 is an enlarged diagramatic view of another embodiment of a device in accordance with the present invention; and FIG. 6 is a schematic of a device for measuring the flow rate in a conduit containing a dirty liquid, utilizing an embodiment in accordance with the present invention.

DETAILED DESCRIPTION

Figure 1:
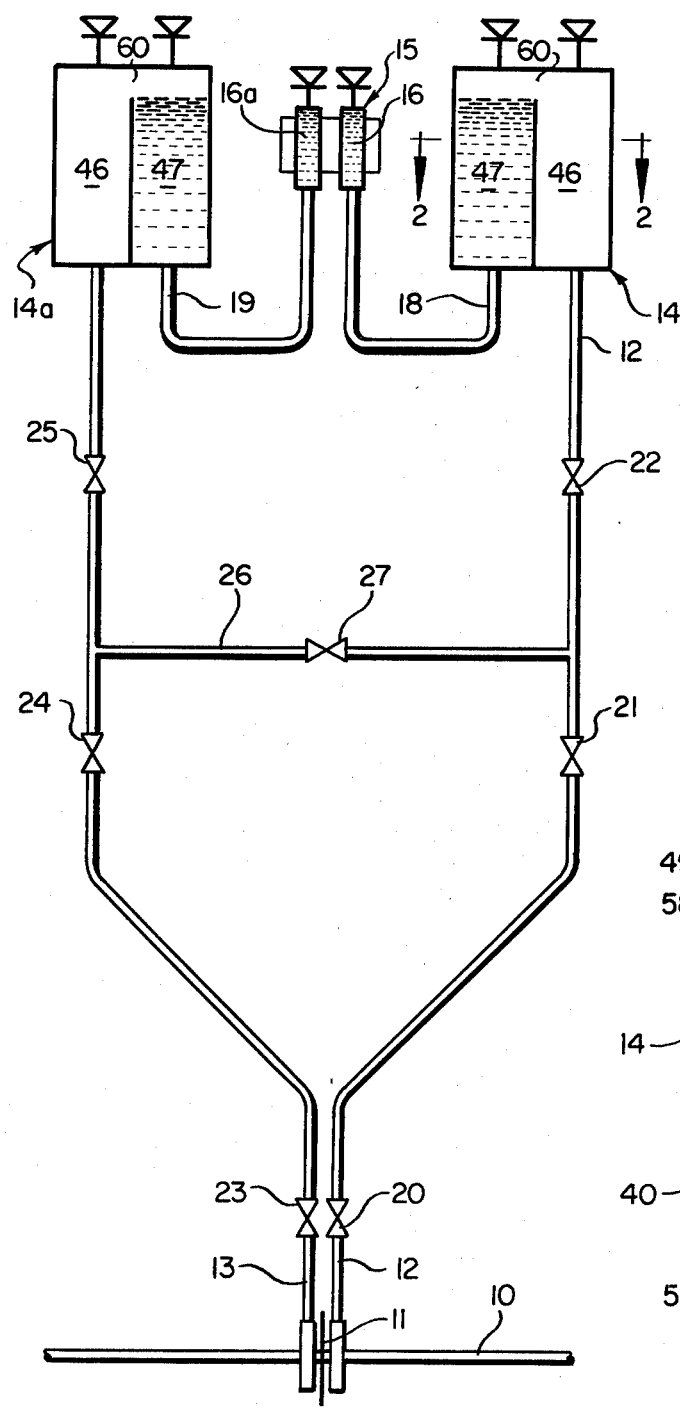
FIG. 1 is a schematic of a device, in accordance with one embodiment of the present invention, for measuring the flow rate in a conduit containing dirty gases.

Referring initially to FIG. 1, indicated at 10 is a conduit for conducting dirty gases, such as coke oven gas. Indicated schematically at 11 on conduit 10 is an orifice plate for measuring the flow rate of the gases in conduit 10. Located on respective opposite sides of orifice plate 11 are lines 12, 13 each connected to a respective interface device, 14, 14a each constructed in accordance with an embodiment of the present invention.

Each interface device 14, 14a is connected by a respective connecting line 18, 19 to a respective cavity 16, 16a in a measuring device indicated generally at 15.

Line 12 includes valves 20, 21, 22 which are normally in an open condition. Line 13 includes valves 23, 24, 25 which also are normally in an open condition. Extending between lines 12 and 13 is a by-pass line 26 containing a valve 27 normally in a closed condition.

Referring to FIG. 4, each cavity 16, 16a of measuring device 15 has one sidewall thereof defined by a flexible diaphragm 30, 30a respectively. The remainder of each cavity 16, 16a is defined by a housing having a top 31, 31a, a bottom 32, 32a and sidewalls 33, 33a, respectively. Each cavity 16, 16a, comprises means for containing a liquid.

Each diaphragm 30, 30a is connected by a respective mechanical linkage 34, 34a to a pressure-measuring instrument 35 from which extends a signal transmitting line 36.

Figure 2:
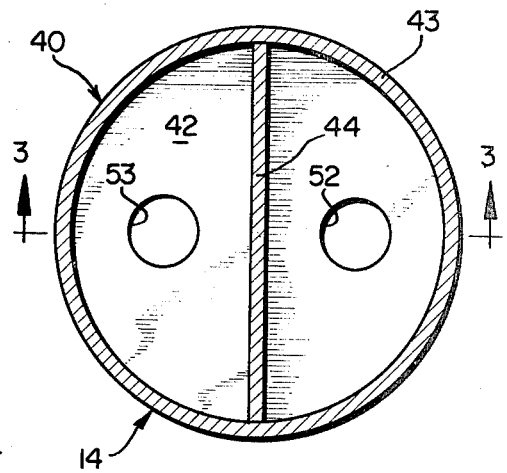
FIG. 2 is an enlarged sectional view taken along line 2—2 in FIG. 1.
Figure 3:
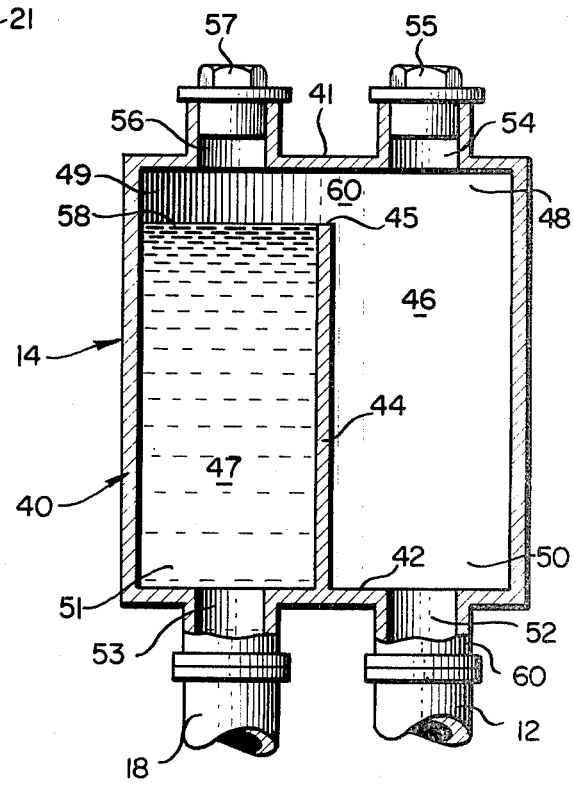
FIG. 3 is a sectional view taken along line 3—3 in FIG. 2.

Interface device 14a is a mirror image of interface device 14, details of which are shown in FIGS. 2 and 3. Interface device 14 comprises a housing indicated generally at 40 and including a top 41, a bottom 42 and cylindrical sidewalls 43. Housing 40 includes a vertical interior separating wall 44 having a top end 45. Wall 44 separates the interior of housing 40 into two vertically disposed chambers 46, 47 each having a respective upper end 48, 49 and lower end 50, 51.

An opening 52 in the bottom end 50 of first chamber 46 communicates with line 12 from fluid conduit 10 and places first chamber 46 in fluid communication with conduit 10. An opening 53 at the bottom end 51 of second chamber 47 communicates with one end of a line 18 having its opposite end connected to the bottom of cavity 16 in measuring device 15, and this places the bottom of second chamber 47 in liquid communication with the bottom of cavity 16.

Communicating with the upper end 48 of first chamber 46 is an opening 54 normally closed by a plug 55, and communicating with the upper end 49 of second chamber 47 is an opening 56 normally closed by a plug 57. Liquid may be introduced into second chamber 47 through opening 56, and this liquid will fill second chamber 47 to level 58, fill connecting line 18 and fill cavity 16 in measuring device 15. As shown in FIG. 1, the top end 45 of interior separating wall 44 is located above the top 31 of cavity 16 in measuring device 15. Accordingly, when second chamber 47 is filled with liquid to level 58, cavity 16 in measuring device 15 is filled with liquid from the bottom 32 to the top 31 thereof (FIGS. 1 and 4). Liquid level 58 is below the top 41 of the housing defining interface device 14.

By maintaining the top surface 58 of the liquid in second chamber 47 above the top 31 of cavity 16, when chamber 47 is filled with liquid, the entire cavity 16 as well as pipeline 18 communicating cavity 16 with second chamber 47 are filled with liquid, thereby eliminating any air pockets from cavity 16, in turn avoiding the errors in measurement which would otherwise be caused due to the presence of air pockets in the cavity.

Located between the upper end 48 of first chamber 46 and the upper end 49 of second chamber 47 is a channel 60 for placing the two upper ends 48, 49 in fluid communication with each other to transmit the fluid pressure of a fluid in first chamber 46 to the liquid in second chamber 47.

The arrangement illustrated in FIG. 1 is for measuring the flow rate of dirty gases in conduit 10. In operation, dirty gases from conduit 10, on one side of orifice plate 11, are conducted through line 12 to chamber 46 of interface device 14, and dirty gases from conduit 10, on the other side of orifice plate 11, and conducted through line 13 to a corresponding chamber 46 in interface device 14a. The pressure of the dirty gas in interface device 14 is the same as the pressure of the dirty gas in conduit 10 on the one side of orifice plate 11, and the pressure of the dirty gas in interface device 14a is the same as the pressure of the dirty gas in pipeline 10 on the other side of the orifice plate 11. The pressure of the gas in first chamber 46 the channel 60 of a respective interface device is transmitted to the liquid in second chamber 47 of that interface device which in turn transmits the fluid pressure to the diaphragm in a respective cavity 16 or 16a. Any change of pressure in cavity 16 or 16a is sensed by diaphragm 30 or 30a and in turn transmitted via mechanical linkages 34, 34a to measuring instrument 35 which in turn transmits a measuring signal through transmission line 36. The difference in respective pressures sensed on opposite sides of orifice plate 11, reflected by differences in the movement of diaphragms 30, 30a, is measured at 35 and converted to the flow rate of gas moving through conduit 10, by conventional means.

During operation, any dirt which enters housing 40 with the dirty gases from conduit 10, accumulates in first chamber 46 from which the accumulated dirt may be periodically withdrawn by removing plug 55 from opening 54 which constitutes a clean-out port for chamber 46.

The liquid in second chamber 47 and the circuitous route (through first compartment 46, connecting channel 60 and the upper end 49 of second compartment 47) which the dirty gases must follow, effectively prevent the dirt in the gas from entering cavity 16. This, in turn, avoids erroneous measurements which might occur due to accumulation of dirt in cavity 16.

The liquid which fills compartment 47, conduit 18 and cavity 16 may be any liquid which is compatible with the fluid being measured (that is, a liquid which is not chemically reactive with the fluid being measured or does not absorb the fluid being measured). Typically, oil or mercury are used as the liquid, and preferably the liquid is a light oil which doesn't become overly viscous during cold weather. Other liquids conventionally used in pressure sensing devices may be employed.

Housing 40 of the interface device may be constructed of plain carbon steel or, if the fluid being measured is corrosive to plain carbon steel, housing 40 may be composed of a material resistant to the corrosive fluid, e.g., a material such as stainless steel, monel, or the like.

The diaphragms in conventional pressure-sensing devices are usually made of stainless steel or other corrosive-resistant material. However, a diaphragm used in conjunction with an interface device in accordance with the present invention need not be composed of corrosive-resistant material, because the diaphragm does not come into contact with any corrosive fluid flowing through conduit 10. Accordingly, the diaphragm may be composed of a less expensive material so long as it satisfies the other characteristics normally required of such a diaphragm, such as fatigue resistance, tensile strength, etc.

The environment surrounding a conduit conducting dirty gases is oftentimes undesirable from the standpoint of measuring instruments. Close to such a conduit, the instruments would be exposed to dirt, extremes of temperature and the danger of being broken. Accordingly, it is desirable to maintain measuring device 15, with its instruments, at a location remote from conduit 10 where the device is not exposed to the adverse conditions surrounding conduit 10. On the other hand, for maintenance and other purposes, it is desirable to locate interface device 14 relatively close to conduit 10.

In accordance with the present invention, interface device 14 may be located at any distance from measuring device 15, and both devices will still operate satisfactorily. Accordingly, interface device 14 may be located as close as possible to conduit 10 (e.g., right atop the conduit), while measuring device 15 (with its environmentally-sensitive instruments) may be located at a location remote from conduit 10 where the instruments in device 13 are isolated from the adverse environmental conditions in the immediate vacinity of conduit 10.

Referring to FIG. 5, the embodiment illustrated therein is for use in measuring the pressure of a gas flowing in a conduit such as 10 illustrated in FIG. 1. However, in this particular embodiment, it is not necessary to use an orifice plate or a pair of pressure-measuring devices. Accordingly, orifice plate 11, connecting line 13, interface device 14a, line 19 and measuring cavity 16a, are eliminated. Connecting line 12, connected to conduit 10, and interface device 14 are the same as in the embodiment of FIG. 1. The measuring device 115 of the embodiment of FIG. 5 includes only a single measuring cavity 16 rather than two measuring cavities 16, 16a as in the embodiment of FIG. 1. The diaphragm 30 on measuring cavity 16 is connected by the usual mechanical linkage 34 to a conventional measuring instrument 135 which, in the embodiment of FIG. 5, measures pressure rather than measuring flow rate as in the embodiment of FIG. 1. The pressure measured by instrument 135 is communicated through a signal line 136.

In the embodiment illustrated in FIG. 6, the fluid conducted in conduit 10 is a dirty liquid. Accordingly, in this particular embodiment, the totality of the structure utilized in measuring the flow rate (or the pressure) in pipeline 10 must be located below the pipeline, in order to maintain a pressure head on the measuring device. This is in contrast to the embodiment of FIG. 1 wherein the totality of the structure could be located above pipeline 10. Otherwise, except for being located below pipeline 10, the remainder of the structure, comprising interface devices 14, 14a and measuring device 15 are essentially the same as in the embodiment of FIG. 1. Only the conduits 112, 113, connecting interface devices 14 and 14a respectively with conduit 10, are different from those of the embodiment of FIG. 1 wherein pipelines 12 and 13 extended upwardly from pipeline 10 rather than downwardly as do conduits 112 and 113 in the embodiment of FIG. 6. Valves and a by-pass line, similar to valves and by-pass line 20–27 shown in FIG. 1 may be included in the embodiment of FIG. 6.

The separating liquid in second compartment 47 of interface devices 14 and 14a must have a density greater than the dirty liquid from conduit 10 which will fill connecting lines 12 and 13 and those parts of interface devices 14 and 14a not filled by the separating liquid. When the separating liquid has the greater density, the dirty liquid will float atop the former and will not penetrate to a cavity 16 and 16a in measuring device 15, thereby maintaining the cavity in a clean condition.

The foregoing detailed description has been given for clearness of understanding only, and no unnecessary limitations should be understood therefrom, as modifications will be obvious to those skilled in the art.

I claim:

1. In a device for measuring the fluid pressure in a fluid-conducting conduit:
   a first housing;
   a cavity in said first housing, said cavity having a top, a bottom and side walls;
   a diaphragm defining one wall of said cavity;
   said first housing comprising means defining the other walls of said cavity;
   said cavity comprising means for containing a liquid;
   a second housing having a top, a bottom and side walls;
   said second housing including a rigid, vertical interior wall terminating at a top end and dividing said second housing into two vertically disposed chambers each having an upper end and a lower end;
   a first connecting line comprising means for placing a first of said two chambers in fluid communication with said fluid-conducting conduit and for transmitting to said first chamber the fluid pressure of the fluid in said conduit;
   said first chamber comprising means for containing therein the fluid from said conduit;
   a second of said chambers comprising means for containing a liquid with the top surface of said liquid above the top surface of the liquid contained in said cavity of the first housing and below the top of said second housing;
   said second housing comprising channel means, located above said top end of said vertical interior wall, for placing the upper end of said chamber in fluid communication with the upper end of said second chamber and for transmitting the fluid pressure of the fluid in said first chamber to the liquid in said second chamber;
   and a second connecting line comprising means for placing the bottom of said second chamber in liquid communication with the bottom of said cavity to transmit the fluid pressure on the liquid in said second chamber to the liquid in said cavity.

2. In a device as recited in claim 1 wherein:
   said top end of the vertical interior wall of the second housing is located below the top of the second housing to define a gap therebetween, said top end of the interior wall being located above the top of said cavity in the first housing.

3. In a device as recited in claim 1 wherein said device is for use with a conduit conducting a dirty gas and said first chamber comprises:
   means for accumulating therein the dirt from said dirty gas;
   and a clean-out port for removing accumulations of dirt from said first chamber.

4. In a device as recited in claim 1 wherein:
   said second chamber and said second connecting line are filled with a first liquid;
   and said cavity is filled with said first liquid from the bottom to the top thereof.

5. In a device as recited in claim 4 wherein said device is for use with a conduit conducting a second liquid and wherein:
   said first liquid has a greater density than said second liquid; and
   said first chamber and said channel means comprise means for containing said second liquid.

6. In a device as recited in claim 1 wherein said device is for use with a conduit conducting a liquid and wherein:
   the entire device is located below said conduit.

7. In a device as recited in claim 1 wherein:
   said second housing is located adjacent said conduit:
   and said first housing is relatively remote from said conduit.

8. In a device as recited in claim 7 wherein:
   said second housing is relatively unprotected from the environment surrounding said conduit;
   and said first housing is isolated from the environment surrounding said conduit.

* * * * *

UNITED STATES PATENT AND TRADEMARK OFFICE
CERTIFICATE OF CORRECTION

PATENT NO. : 4,231,261
DATED : November 4, 1980
INVENTOR(S) : Charles W. Elmer

It is certified that error appears in the above-identified patent and that said Letters Patent are hereby corrected as shown below:

Col. 3, line 46, "and conducted" should be

--are conducted--.

Col. 3, line 55, "the channel" should be

--and channel--.

Signed and Sealed this

Thirteenth Day of January 1981

[SEAL]

Attest:

SIDNEY A. DIAMOND

Attesting Officer

Commissioner of Patents and Trademarks